United States Patent [19]
Steckel

[11] Patent Number: 6,066,601
[45] Date of Patent: May 23, 2000

[54] COATING ADDITIVE, COATING COMPOSITION CONTAINING SAID ADDITIVE AND METHOD FOR COATING A SUBSTRATE USING SAID COATING COMPOSITION

[75] Inventor: Thomas F. Steckel, Chagrin Falls, Ohio

[73] Assignee: The Lubrizol Corporation, Wickliffe, Ohio

[21] Appl. No.: 09/167,293

[22] Filed: Oct. 6, 1998

Related U.S. Application Data

[62] Division of application No. 09/103,914, Jun. 24, 1998, Pat. No. 5,863,875.

[51] Int. Cl.$^7$ .................................................. C10M 141/00
[52] U.S. Cl. ........................ 508/181; 508/287; 508/293; 508/295; 508/554; 508/555; 427/385.5; 524/795; 524/904
[58] Field of Search ............................. 508/181; 524/795, 524/904; 427/385.5

[56] References Cited

U.S. PATENT DOCUMENTS

| | | | |
|---|---|---|---|
| 4,898,779 | 2/1990 | Yoshimura et al. | 428/402 |
| 5,346,727 | 9/1994 | Simkin | 427/486 |
| 5,405,912 | 4/1995 | Simkin | 525/199 |
| 5,780,401 | 7/1998 | Steckel | 508/551 |
| 5,863,875 | 1/1999 | Steckel | 508/551 |

FOREIGN PATENT DOCUMENTS

| | | |
|---|---|---|
| 61-21977B | 5/1986 | Japan . |
| 63-44023 | 9/1988 | Japan . |

OTHER PUBLICATIONS

*Journal of Coatings Technology*, vol. 62, No. 791, Dec. 1990 "Development of New Additives to Improve Scratch Resistance and Impart Slip to Solvent–Based Coating Systems", by F. Funk et al.

*Primary Examiner*—Ellen M. McAvoy
*Attorney, Agent, or Firm*—Jeffrey F. Munson; Joseph P. Fischer; Samuel B. Laferty

[57] ABSTRACT

A coating additive composition containing the combination of a) at least one non-crosslinked product made by the reaction of an amine and a carboxylic acid, the product containing at least two hydrocarbyl groups each having about 12 to about 100 carbon atoms; and (ii) at least one fluoropolymer. The additive composition is useful as a nonflatting slip-enhancing agent in both in solvent-based and powder coatings. The cured coatings exhibit lower coefficient of friction and substantial gloss retention.

24 Claims, No Drawings

COATING ADDITIVE, COATING COMPOSITION CONTAINING SAID ADDITIVE AND METHOD FOR COATING A SUBSTRATE USING SAID COATING COMPOSITION

This application is a divisional of application Ser. No. 09/103,814 filed Jun. 24, 1998, now U.S. Pat. No. 5,863,875.

BACKGROUND OF THE INVENTION

1. Field of the Invention

The present invention relates to non-flatting and slip-enhancing coating additives, to coating compositions containing the additives, and to a process for coating a substrate using the coating compositions.

2. Description of Related Art

Slip is the relative movement between two objects that are in contact with each other. If an object is moved along a surface, there is a resistance acting in a direction opposite the movement. The resisting force is also called frictional force, friction resulting from the unevenness of the two surfaces in contact.

Coating systems, including powder coatings are susceptible to damage when in contact with solid objects. Paint films, for instance, can be easily damaged during drying, when they have not yet cured. In the case of baking enamels, damage can occur when the films have not yet cooled. In addition, scratches, which are discontinuities on surfaces, can cause attachment of air-borne contaminants and corrosive agents leading eventually to corrosion problems. A common problem with many powder coatings is that they are subject to mar or scratching.

Slip additives provide some degree of protection against such damages. For example, in automotive coating applications, they protect the not fully hardened freshly applied enamels, and in can coatings, they protect the coating during filling and distribution.

The concepts of slip and mar (or scratch) resistance are very closely interrelated in that the same additive may perform both functions-impart slip and provide scratch resistance; in addition the principle underlying both is the same. A hard object touching a paint film containing an additive can be deflected due to the surface lubricity of the additive. This results in a greater apparent film hardness or scratch resistance.

A slip additive should generally fulfill several requirements. The additive should migrate to the film surface during the drying process, forming a film which not only adheres to the coating, but also favorably influences its flow and leveling properties. In addition, this film should have lubricating qualities, expressed as the ability to carry a load in a very thin layer.

Compounds based on silicone chemistry have been used as mar and slip additives for about 30 years. Examples of silicone-based slip additives include polydimethylsiloxanes, polyoxyalkylenesiloxane (polysiloxane/polyether) copolymers, and polyoxyalkylene methylalkylsiloxane copolymers.

The problem with many slip additives is that they reduce the gloss of the cured coating. The present invention provides enhanced slip (reduction of coefficient of friction) to cured powder coatings useful in rendering the cured coatings more resistant to mar or scratch without an appreciable loss in gloss.

A detailed description describing the concept of slip and mar and the developments of additives to improve scratch resistance and impart slip can be found in an article by F. Fink, et al., entitled "Development of New Additives to Improve Scratch Resistance and Impart Slip To Solvent-Based Coating Systems" in *Journal of Coatings Technology,* Vol. 62, No. 791, December 1990.

U.S. Pat. No. 4,898,779, Yoshimura et al, Feb. 6, 1990, discloses powders of tetrafluoroethylene copolymer having a non-spherical particle shape, a frictional packing ratio of 20 to 100% and an average particle size of 5 to 500 $\mu$m. The powders are useful for powder coatings, particularly roto-moulding, roto-lining and electrostatic coating.

U.S. Pat. No. 5,346,727, Simkin, Sep. 13, 1994, discloses a process of coating a substrate such as aluminum by the steps of (a) applying thereon a powder coating composition prepared by (i) blending a mix containing a poly(vinylidene fluoride) resin, a thermoplastic resin, a pigment, and a vinylidene fluoride/tetrafluoroethylene/hexafluoropropylene terpolymer, (ii) pelletizing the blend from (i), and (iii) cryogenically grinding the pellets from(ii); (b) heating the powder coating composition above its melt temperature; and (c) cooling the coated substrate.

U.S. Pat. No. 5,405,912, Simkin, Apr. 11, 1995, discloses the use of vinylidene fluoride/tetrafluoroethylene/ hexafluoropropylene terpolymer in polyvinylidene fluoride based powder coating resins to enhance the aesthetics of coatings made therefrom.

Japanese Patent 61-21977B, Tada et al., May 29, 1986, discloses a powdered smoothing agent for powder paints prepared by heating and fusing a mixture of an amide wax and an acrylic polymer. The amide wax can be made from a carboxylic acid, such as stearic acid and an amine, such as diethanol amine.

Japanese Patent Publication No. 63-44023, Suzuki et al., Sep. 2, 1988 discloses a method of forming a coated layer of low frictional resistance on the surface of an article such as a slip joint of a safety belt connected to a car seat, said method comprising immersing the article to be coated in a fluidized bed containing 100 parts weight of polyamide powder and 0.01–5 parts by weight of PTFE powder, and thereby applying the mixed powders as a low-friction coating on the surface of the particle.

SUMMARY OF THE INVENTION

The present invention relates to a composition comprising the combination of (a) at least one non-crosslinked product made by the reaction of an amine and a carboxylic acid or a reactive equivalent of said carboxylic acid; said reaction product comprising at least two hydrocarbyl groups each hydrocarbyl group having about 12 to about 100 carbon atoms; and (b) at least one fluoropolymer.

The invention also relates to a coating composition comprising a film-forming resin and a non-flatting and slip-enhancing amount of an additive composition comprising the foregoing combination of (a) and (b), and to a method for coating a substrate using the foregoing coating composition.

DETAILED DESCRIPTION OF THE INVENTION

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl)

substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

A straight-chain hydrocarbyl group is a hydrocarbyl group that is free from branching and ring structures. However, such a hydrocarbyl group can still have a hetero substituent that does not alter the predominantly hydrocarbon character of the hydrocarbyl group.

The phrase "reactive equivalent" of a material means any compound or chemical composition other than the material itself which reacts or behaves like the material itself under the reaction conditions. Thus reactive equivalents of a carboxylic acid will include acid-producing derivatives such as an anhydride, an acyl halide, and mixtures thereof unless specifically stated otherwise.

The composition of the present invention comprises a combination of (a) at least one non-crosslinked product made by the reaction of an amine and a carboxylic acid or a reactive equivalent of the carboxylic acid and (ii) at least one fluoropolymer.

The Amine (a)

The amine of this invention can be any amine that can react with the carboxylic acid to yield a reaction product that has at least at least two hydrocarbyl groups, each having about 12 to about 100 carbon atoms, and in one embodiment about 12 to about 30 carbon atoms, and in one embodiment about 16 to about 24 carbon atoms.

In one embodiment, the amine is a secondary monoamine of the formula $NR^1R^2H$ wherein $R^1$ and $R^2$ are independently selected from the group consisting of hydrocarbyl groups and hydroxyalkyl groups represented by the formula

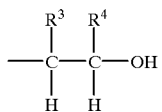

wherein $R^3$ and $R^4$ are independently hydrogen or a hydrocarbyl group.

The amine includes aliphatic, cycloaliphatic, aromatic, or heterocyclic amines. The amine can also contain non-hydrocarbon substituents or groups as long as these groups do not significantly interfere with the reaction of the amines with the carboxylic acid (or its reactive equivalent) of this invention. Such non-hydrocarbon substituents or groups include lower alkoxy, lower alkyl mercapto, nitro, interrupting groups such as —O— and —S— (e.g., as in such groups as —CH$_2$CH$_2$—X—CH$_2$CH$_2$— where X is —O— or —S—).

Specific examples of secondary monoamines include diethylamine, di-n-butylamine, dicocoalkylamine, dioctadecylamine, di-(hydrogenated tallow-alkyl)amine, dioleylamine, distearylamine, dilaurylamine, N-methyllaurylamine, N-methyloctylamine and didodecylamine. Many of the higher ($C_{12}$ and higher) alkyl amines are available commercially under the registered tradename Armeen™ available from Akzo Chemicals. When any R of the amine $NR^1R^2H$ is a hydroxyalkyl group represented by the formula

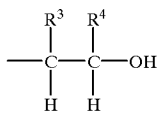

wherein $R^3$ and $R^4$ are independently hydrogen or a hydrocarbyl group of 1 to about 30 carbon atoms, the preferred $R^3$ and $R^4$ are independently hydrogen or a hydrocarbyl group of 1 to 2 carbon atoms. An example of a preferred amine comprising hydroxyalkyl groups is diethanolamine.

The amine of this invention also includes polyamines of the formula D-(NGH)$_y$ wherein D is a multivalent organic radical having 2 to about 30 carbon atoms, and in one embodiment 2 to about 10 carbon atoms; each G independently is hydrogen, a hydrocarbyl group, or a hydroxyalkyl group represented by the formula

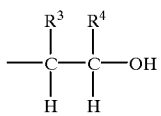

wherein $R^3$ and $R^4$ are defined as above; and y is at least 2; provided that if D is an organic radical containing 2 carbon atoms and y is 2, at least one G must be a hydrocarbyl group of 1 to about 30 carbon atoms.

The term "organic radical" includes any chemical group consisting of combinations of carbon, hydrogen and other heteroatoms such as nitrogen, and oxygen. The radical may have a valency of two (divalent) or higher (multivalent). Thus D can be a hydrocarbylene group of 2 to about 30 carbon atoms or an alkylene polyamine represented by the formula:

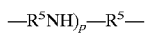

wherein $R^5$ is an alkylene group of 2 to about 10 carbon atoms, and p is 1 to about 10. When D is an alkylene polyamine, the amine D-(NGH)$_y$ is also an alkylene polyamine. Examples of such polyamines include ethylenepolyamines, butylenepolyamines, propylenepolyamines and pentylenepolyamines. Specific examples of such polyamines include diethylenetriamine (DETA), triethylenetetramine (TETA), tris-(2-aminoethyl)amine, propylenediamine, trimethylenediamine, tripropylenetetramine, tetraethylenepentamine, hexaethyleneheptamine, and pentaethylenehexamine. In one embodiment, the amine represented by the formula D-(NGH)y is N-tallowalkyl dipropylene triamine, commercially available under the registered tradename "Tiameen™ T", from Akzo Chemicals. In one embodiment, the amine is a trifunctional amine having three primary amine functionalities. In one embodiment this trifunctional amine is represented by the formula

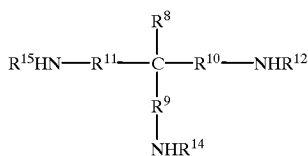

wherein $R^6$, $R^{12}$, $R^{13}$, and $R^{14}$ are independently a hydrogen or a hydrocarbyl group of 1 to about 30 carbon atoms; $R^9$, $R^{10}$, and $R^{11}$ are independently an alkylene group of 1 to about 10 carbon atoms. An example of this trifunctional amine is 4-aminomethyl-1,8-octanediamine (triaminononane), available from Monsanto. It is represented by the structure:

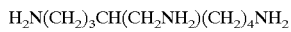

The amine of this invention includes diamines represented by the formula

wherein n is at least 2, and each R is independently hydrogen or hydrocarbyl, provided that if n is 2, at least one R must be hydrocarbyl. When both R groups are hydrogen, the diamines are of a homologous series, such as propylene diamine, butylene diamine, pentylene diamine, hexamethylene diamine etc. Examples of diamines where both R are not H include N-coco-1,3-diaminopropane, N-tallow-1,3 diaminopropane, N,N,N'-trimethyl-N'-tallow-1,3-diaminopropane, N-oleyl-1,3-diaminopropane, N,N,N'-trimethyl-N'-9-octadecenyl-1,3-diaminopropane, 3-tallowalkyl-1,3-diaminopropane, and 3-tallowalkyl-1,3-hexahydropyrimidine, all commercially available under the tradename Duomeen™ marketed by Akzo Chemicals. The preferred diamines of this invention are 1,6-diaminohexane, 3-tallowalkyl-1,3-diaminopropane, and triaminononane.

The amine of this invention also includes polyether diamines (also called polyglycol polyamines). The polyetherdiamines make up a family of products having repeating polyether backbone structures containing repeating ethylene oxide, propylene oxide, or mixed ethylene oxide/propylene oxide units such as polyoxyalkylene diamines represented by the formula

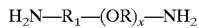

and

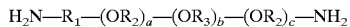

where $R_1$ is the alkylene group, $R_2$ and $R_3$ are ethylene or propylene groups, and x, a, b, and c indicate number of repeating units of ethylene oxide and propylene oxide groups. These repeating units are present on average more than once.

The polyetherdiamines include those that are available under the trade name "Jeffamine™" by Huntsman Chemical Company.

Other suitable diamines are the urea condensates of Jeffamine™-D series products represented by the formula

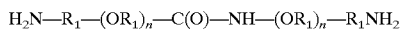

where $R_1$ is the alkylene group and n is on the average about 5.6, such as Jeffamine™ DU-700.

The Carboxylic Acid (a)

The carboxylic acids used to form the non-crosslinked product (a) of this invention can be represented by the formula B—(COOH)$_z$, or a reactive equivalent thereof, wherein B is a direct link between two COOH groups, a mono- or a multivalent organic radical, and z is 1–5, preferably 1–3. The carboxylic acids include aliphatic and aromatic carboxylic acids as well as polycarboxylic acid compounds having multiple carboxylic acid functionalities or reactive equivalents thereof, such as esters, anhydrides or acyl halides. Monocarboxylic acids which may be used have the formula RCOOH, wherein R is a hydrocarbyl group, preferably an aliphatic group. Preferably R contains from 1 to about 30 carbon atoms. Examples of aliphatic carboxylic acids include formic acid, acetic acid, propanoic acid, butanoic acid, decanoic acid, myristic acid, palmitic acid, oleic acid, stearic acid, isostearic acid, lauric acid, caprylic acid, capric and behemic acid. In one embodiment, the carboxylic acid is a straight chain saturated 18 carbon carboxylic acid, namely stearic acid.

Compounds useful as the polycarboxylic acid in this invention can be selected from any aromatic, aliphatic or cycloaliphatic, straight chain or branched chain, saturated or unsaturated dicarboxylic acid which have at least 2 carbon atoms, and more preferably 3 to about 40 carbon atoms. Examples of these are oxalic acid, malonic acid, succinic acid, glutaric acid, adipic acid, pimelic acid, suberic acid, sebacid acid, azelaic acid, undecanedioic acid, 1,11-undecanedicarboxylic acid, dodecanedioic acid, hexadecanedioic acid, docosanedioic acid, maleic acid, fumaric acid and the like either alone or mixtures thereof. The term "dicarboxylic acids" is also used to include hydroxy substituted dicarboxylic acids. Representative of hydroxy substituted dicarboxylic acids are tartaric acid, citric acid and hydroxyisopthalic acid.

Dicarboxylic acids can also include the substituted succinic acids represented by the formula

wherein R is a hydrocarbyl group, including an olefin polymer-derived group formed by polymerization of such monomers as ethylene, propylene, 1-butene, isobutene, 1-pentene, 2-pentene, 1-hexene, and 3-hexene. Such groups usually contain about 30 to about 200, more often up to about 100 carbon atoms. Reactive equivalents of said dicarboxylic acids include succinic anhydrides of the formula

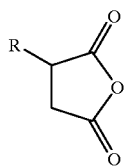

wherein R is a hydrocarbyl group, including an olefin-polymer derived group as disclosed for the succinic acid above.

Also useful are oligomers of fatty acids which are substantially comprised of dimerized fatty acids. They are normally called "dimer acids", and are made by the thermal coupling unsaturated vegetable acids. They are available from Emery, Westvaco, Henkel, Unichema and other companies. Trade names of these dimer acids include Empol™ from Henkel Corporation, and Pripol™, from Unichema International. Illustrative examples of branched dimer acids are Empol™ 1004, Empol™ 1008, Empol™ 1018, Empol™ 1016. Dimer acids are described in U.S. Pat. Nos. 2,482,760, 2,482,761, 2,731,481, 2,793,219, 2,964,545, 2,978,468, 3,157,681, and 3,256,304.

In addition to the dicarboxylic acids, acids containing more than two carboxylic acid groups are also useful. Representative examples of these polybasic acids are trimellitic acid, trimesic acid, citric acid, 1,2,3,4-butanetetracarboxylic acid and the like. Polymerized polybasic acids which contain more than two carboxylic acid groups are also included in the definition of polybasic acids. The polymeric polybasic acids with 3 carboxylic acid groups are known as "trimer acids". These trimer acids are commercially available under the trade name Empol™ from Henkel Corporation-Emery Group, and Unidyme™ from Union Camp Corporation. Representative examples of these trimer acids are Empol™ 1040, Empol™ 1041. Polybasic acids which are mixtures of di, tri, tetra, penta, and hexacarboxylic acids are also useful for this invention.

Polyacid reaction products of unsaturated vegetable acids with acrylic acid and maleic anhydride are available from Westvaco under the product names Diacid™ 1550 and Tenax™ 2010, respectively. Another useful vegetable derived acid is 12-hydroxystearic acid, which can provide both carboxy and hydroxy functionality to the polyester.

The Product (a)

The product made by the reaction of the amine and the carboxylic acid of this invention will contain at least two hydrocarbyl groups of about 12 to about 100 carbon atoms each, and in one embodiment about 12 to about 30 carbon atoms each. These hydrocarbyl groups can come from either the amine component alone, the carboxylic acid component alone or one each from the amine and carboxylic acid components. Moreover, the reaction product should not be the result of cross-linking or polymerization reaction between two molecules, each having multiple amine or carboxylic acid functionalities. Thus, both the amine component and the acid component should not at the same time contain reactive functionalities greater than two.

Chemically, the non-crosslinked product (a) of this invention can include amides, imides, imidazolines, oxazolines, amine salts, or mixtures containing these functionalities along with other non-nitrogen containing functionalities such as esters. For instance, in one preferred embodiment, 3 moles of stearic acid is reacted with one mole of diethanolamine to give a product primarily containing on average one amide and two ester functionalities in the same molecule, although small amounts of carboxylic acid-amine salts may also be present. In one embodiment, the reaction product of this invention is made by reacting the acid and amine components together at elevated temperatures (150°–210° C.) for several (2–8 hours) and removing the water of condensation. If desired, a small amount of water (e.g. 4%) can be included with the reactants.

The Fluoropolymer (b)

One component of the composition of the present invention is a fluoropolymer. This polymer is combined with component (a) to form the composition of the present invention.

The fluoropolymer (b) includes polymers produced from alkenes in which one or more hydrogens have been replaced by fluorine. Important fluoropolymers include polytetrafluoroethylene (PTFE), having the tetrafluoroethylene repeat unit $(-CF_2CF_2-)_n$, polychlorotrifluoroethylene (PCTFE), having the repeat unit $(-CF_2CFCl-)_n$, poly(vinyl fluoride) (PVF), having the repeat unit $(-CF_2CHF-)_n$, poly (vinylidene fluoride) (PVDF), having the repeat unit $(-CH_2CF_2-)$, copolymers of tetrafluoroethylene with ethylene, perfluoroproyl vinyl ether, and perfluoropropylene; and the copolymer of ethylene and chlorotrifluoroethylene. In one embodiment, the fluoropolymer (b) is a homopolymer of tetrafluoroethylene. The PTFE may be virgin PTFE, radiated PTFE, or recycled PTFE. Suitable examples of PTFE homopolymers include those available from Dupont under the name "ZONYL™" fluoroadditives, from Hoechst and Dyneon under the name "HOSTAFLON™" PTFE, and from ICI under the name "FLUON™". Specific examples of these include ZONYL™ MP 1000, MP 1100, MP 1200, MP 1500J, MP 1600N; HOSTAFLON™ TF 1620, TF 1641, TF 1645, TF 9201, TF 9202, TF 9205, TF X 9207; and FLUON- FL 1700.

The "ZONYL™" fluoropolymers are finely divided white powders of PTFE. The properties of several of these are summarized in the table below.

| ZONYL™ Fluoropolymer | Average Bulk Density (g/L) (ASTM D4894) | Melting Peak Temperature (° C./° F.) (ASTM D4894) | Particle Size Distribution (μm) (Volume Basis) (Laser Microtrac) | Specific Surface Area (m²/g) (Nitrgoen Absorption) |
| --- | --- | --- | --- | --- |
| MP 1000 | 500 | 325 ± 5/617 | 10% < 3 Avg. 12 90% < 30 | 7–10 |
| MP 1200 | 450 | 325 ± 5/617 | 10% < 1.0 Avg. 3 90% < 9 | 1.5–3 |
| MP 1400 | 425 | 325 ± 5/617 | 10% < 3 Avg. 10 90% < 20 | 1.5–3 |
| MP 1500J | 425 | 330 ± 5/626 | 10% < 10 Avg. 20 90% < 35 | 8–12 |
| MP 1600N | 350 | 325 ± 5/617 | Avg. 12 | 8–12 |

The "HOSTAFLON™" fluoropolymers are white, fine-particle powders of low molecular weight PTFE. They are produced by direct polymerization and by direct degradation of high molecular weight PTFE. The properties of several of these are summarized in the table below.

| HOSTA-FLON™ TF micropowder | Bulk Density (g/L) (ISO 12086)) | Average Particle Size (μm) (Laser Diffraction) | Primary Particle Size (nm) (Laser Diffraction) | Specific Surface Area (m²/g) (BET Nitrgoen Absorption) |
| --- | --- | --- | --- | --- |
| TF 9201 | 350 | 6 | 200 | 10 |
| TF 9202 | 300 | 4 | 190 | 11 |
| TF 9205 | 400 | 8 | — | 2 |
| TF X 9207 | 280 | 4 | 120 | 17 |

In one embodiment, the PTFE homopolymer has a bulk density ranging from about 250 to about 500 g/L (grams per liter) as measured by standard test method ISO 12086 or ASTM D4894.

In one embodiment, the weight ratio of the reaction product of the amine and the carboxylic acid (component (a)) to the fluoropolymer (component (b)) ranges from about 70:30 to about 99:1, and in one embodiment from about 80:20 to about 95:1 and in one embodiment from about 85:15 to about 95:1.

The additive composition of this invention (i.e., the composition comprising the combination of components (a) and (b) can be added directly to a film forming resin composition or it can be diluted with a carrier (a substantially inert, normally liquid diluent) to form an additive concentrate. The carrier may be an aqueous or an organic diluent. The organic diluent includes butyl cellosolve, butyl acetate and methyl isoamyl ketone. The concentrates generally contain from about 10% to about 90% by weight of the additive composition of this invention and may contain, in addition one or more other conventional additives known in the art.

The Coating Composition

The coating compositions of this invention include solvent-based coating compositions and solvent-free coating compositions, such as powder coating compositions.

The words "solvent-based coating compositions" denote coating compositions that employ at least one solvent as one of the components of the coating composition. The solvents used in solvent-based coating compositions include organic solvents (such as aliphatic and aromatic hydrocarbon solvents) for organic coating compositions as well as water for aqueous coating compositions.

Powder coating compositions are well known to those skilled in the art. They are coating compositions made almost entirely from solid components. Although in such a composition, there might be a few components that might be in the form of a liquid, the composition as a whole is in the form of a powder. The word "powder" here is meant to include not only materials with a very small particle size (less than 10 micron) but also those with larger sizes, such as granules and other particulate matter. Typically, the particle size of a power coating composition will vary from 0.3 to 300 microns, more commonly from 0.3 to 105 microns. Powder coatings were developed in response to a recognized need and desire by the coatings industry to reduce energy consumption and solvent emission.

The Film-Forming Resin Composition

One component of the present coating composition is a film-forming resin composition. The words "film forming resin composition" include the complete system of:

1) a polymer (also called resin or "binder") that is capable of forming a film (the "film-forming resin") either with a curing agent (also known as crosslinking agent, curative, crosslinker or hardener) or without a curing agent (such as by air-drying or by the application of heat);

2) a crosslinking agent, if necessary;

3) any catalyst or accelerator that may be necessary to facilitate the reaction between the film forming resin and the crosslinking agent.

Polymers which can be employed as the film forming resin include oil-free polyester resins, unsaturated polyester resins, alkyd resins, acrylic resins and epoxy resins.

As the words "film forming resin composition" include any curative (crosslinking agent) that may be used for crosslinking, the aforementioned resins also intrinsically include urethane resins which form when a di-or polyisocyanate group (—NCO—) bearing intermediate (such as an isocyanate curative) reacts with a di- or polyhydroxyl-bearing species. The species used to react with the isocyanate functionality can be described as any hydrogen donor bearing two or more active hydrogens. Although there is a large array of hydrogen donors for use by the paint chemist in the preparation of polyurethane coatings, hydroxyl-based systems are especially useful. Useful hydroxyl-based systems include hydroxylated acrylics, hydroxylated (saturated) polyesters, epoxies and other polyether-based polyols, polycaprolactone-based polyols, castor oil derivatives, and polyamides, phenolics and amino systems. Useful isocyanate-terminated species include the aliphatics, hexamethylene diisocyanate and isophorone diisocyanate and the aromatic species, toluene diisocyanate and diphenylmethyl diisocyanate.

The film-forming resin can be a thermoplastic resin or a thermosetting resin. Thermoplastic resins do not chemically react upon the application of heat but melt and flow over the part to be coated. Upon cooling, the film hardens can be remelted again by the simple application of heat. Thermosetting resins are reactive systems, and a chemical reaction—crosslinking—takes place between the resin and a hardener (crosslinking agent) molecules upon application of heat. This leads to a cured or hardened film which can no longer be melted upon reheating. Thermosetting resins also include water curing systems, such as moisture curing urethanes.

Suitable examples of thermoplastic resins for the coating composition of the present invention include acrylics, vinyls, high styrene resins, chlorinated rubber, cellulosic esters, and cellulosic ethers. Specific examples include polyethylene, polypropylene, polytetra-fluoroethylene, polyvinyl chloride, polyvinyl chloride/polyvinyl acetate, polystyrene, polyacrylates and polymethacrylates, nitrocellulose, polyvinyl butyral, polyvinylidene chloride and styrene butadiene.

Suitable examples of thermoplastic resins specifically for powder coating compositions include polyolefins, including low density polyethylene (LDPE) and polypropylene, polyvinylchloride (PVC), polyamides, polyesters, chlorinated polyethers, and cellulose-acetobutyrate.

What follows is a brief description of some of the film forming resins which may be used in accordance with this invention. A brief description of the curatives and/or curing reactions is also included when the resin is also used as a thermosetting resin.

The film forming resins that are useful include epoxy resins. These include any one of a number of well known organic resins which are characterized by the presence therein of the epoxide group

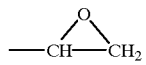

A wide variety of such resins are available commercially. Such resins have either a mixed aliphatic-aromatic or an exclusively non-benzenoid (i.e., aliphatic or cycloaliphatic) molecular structure.

Examples of epoxy resins that can be used include diglycidyl ether of bisphenol A (DGEBA; made by reacting epichlorohydrin with bisphenol A); further reaction products of DGEBA with additional bisphenol A to yield solid, linear and difunctional epoxy resins; and epoxy novolac resins. The epoxy resins can be crosslinked with a variety of hardeners or curing agents to yield coatings with excellent adhesion, good mechanical and physical properties, and very good corrosion resistance. These curing reactions include epoxy-amine reactions, epoxy-phenolic reactions, epoxy-anhydride reactions, epoxy-carboxyl reactions, and epoxy-epoxy reactions.

The film-forming resins also include oil-free polyester resins. The words "polyester resin" will henceforth be used to refer to an oil-free polyester resin which is to be distinguished from an unsaturated polyester resin. Polyester resins are the reaction products of multifunctional alcohols (such as glycols) with multifunctional acids or acid anhydrides. The ratio of multifunctional alcohol to acid or acid anhydride determines the type of reactive end-group, i.e., an excess of glycol will result in hydroxy terminated (or hydroxy functional) polyesters whereas an excess of acid or acid anhydride will result in a carboxyl terminated (or carboxy functional) polyester. Useful starting materials as far as the acidic portion is concerned include terephthalic acid, isophthalic acid, maleic anhydride, trimellitic anhydride, and adipic acid. Useful multifunctional alcohols include ethylene glycol, diethylene glycol, 1,4-butanediol, trimethylolpropane, and neopentylglycol. For thermosets (thermosetting resins), curing agents for hydroxy functional polyesters include blocked isocyanates. The aliphatic hydroxyl groups of the OH-functional polyester can react with isocyanates as shown in Scheme 1 below:

Scheme 1: Reaction of an aliphatic hydroxyl group with an isocyanate

R—N=C=O + HO—CH₂—R₁ →

R—N(H)—C(=O)—O—CH₂—R₁

Since this reaction occurs readily at room temperature, it is necessary to block one of the two reactants and this is normally the isocyanate group. A useful blocking agent is ε-caprolactam. Useful isocyanates include toluene diisocyanate (TDI), 4,4'-diphenylmethane diisocyanate (MDI), 1,6-hexamethylene diisocyanate (HMDI) and isophorone diisocyanate (IPDI). In some instances, however, these compounds are considered to be toxic; it is therefore preferable to form an adduct of the diisocyanate with a triol such as trimethylol propane or a diol such as ethylene glycol. This can be done by reacting an excess of the diisocyanate with the alcohol to form an isocyanate terminated adduct, as exemplified in Scheme 2 below. Scheme 2: Reaction of a diisocyanate with a diol to form an isocyanate terminated adduct

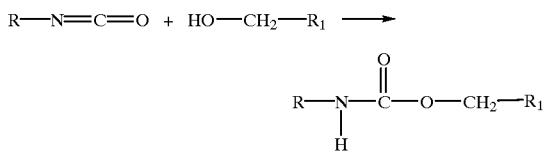

This in turn can be blocked with ε-caprolactam to yield the idealized structure shown in Scheme 3 below:

Scheme 3: Formation of ε-Caprolactam Blocked Isocyanate

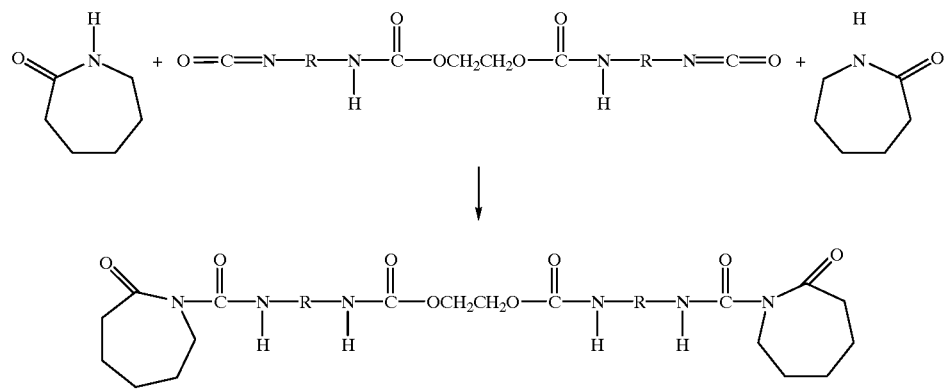

The reactive isocyanate group can be freed during curing and react with the aliphatic hydroxyl groups of the polyester since the ε-caprolactam is released at temperatures above about 160° C.

Other blocking agents for isocyanates (such as ketoximes) can be used provided the blocked isocyanate is in solid state at room temperature.

The crosslinking agents useful for the present invention also include those that are self-blocked ("blocked agent free") isocyanates having a uretdione linkage. Examples of these self-blocked isocyanate crosslinking agents include those available from Hüls America under the tradename "VESTAGON™ BF-1540", having an average equivalent weight of about 280 and an isocyanate content (% NCO) of 14.7 to 16.7. This crosslinking agent is described as a VESTANAT™ IPDI (isophorone diisocyanate) adduct, which has internally blocked structures. As a result, no blocking agent is liberated during curing. The product can be processed up to the unblocking temperature of greater than about 160° C.

In one embodiment of the present invention, the film forming resin composition comprises a polyester resin and an isocyanate-containing curative. That is, a hydroxy-functional polyester is reacted with a blocked isocyanate to result in a polyurethane. In one embodiment, the hydroxy-functional polyester has a hydroxy equivalent weight of about 1400 (a hydroxyl number of about 40) and an acid number of about 13. It is available from the Ruco Polymer Corporation under the name "RUCOTE™ 102". In one embodiment, the hydroxy-functional polyester has a hydroxy equivalent weight of about 1870 (hydroxyl number of about 30) and an acid number of about It is available from the Ruco Polymer Corporation under the name "RUCOTE™ 112". The isocyanate curatives typically include blocked isocyanates which are solids. In a preferred embodiment, the blocked isocyanate is an ε-caprolactam blocked isophorone isocyanate adduct. It has an equivalent weight of about 280 and is marketed by Ruco Polymer Corporation under the name "RUCOTE™ NI-2".

For carboxy, functional polyesters, the curing agents include solid polyepoxides and β-hydroxyalkylamides. Useful solid polyepoxides in powder coatings include triglycidyl isocyanurate (TGIC) produced from the reaction between epichlorohydrin and cyanuric acid. The curing mechanism is believed to involve the reaction of the epoxy group with the carboxyl group at elevated temperatures. A base catalyst is sometimes used to accelerate the reaction. Tetrafunctional β-hydroxyalkylamides are believed to crosslink via simple esterification reaction with the elimination of water.

In one embodiment of the present invention, the film forming resin composition comprises an epoxy-polyester hybrid resin. The epoxy component of the hybrid can be a bisphenol A based epoxy resin having an epoxy equivalent weight of 730 to 820. It is a "type 3–3.5" resin having on average 3-3.5 hydroxyl-substituted propoxy bisphenol A units (n=3–3.5 on average in structure below):

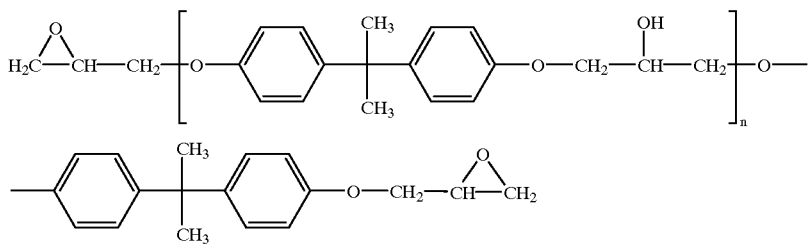

This epoxy resin is available from Dow Chemical Company under the name "D.E.R.™ 663U". The polyester resin in this epoxy-polyester hybrid is believed to be a saturated carboxylated (i.e. carboxy-functionalized) polyester resin having an acid number of 70 to 85, and a glass transition temperature of about 56° C. This polyester resin is available from DSM Resins BV under the name "URALAC™ P 5127". The curing reaction for this epoxy-polyester hybrid is believed to involve epoxy-carboxyl reactions, where the carboxyl terminated polyester cures the epoxy resin. The reaction between and epoxy group and a carboxylic acid group proceeds readily at elevated temperatures, producing ester and hydroxy functionalities. This reaction sometimes utilizes a suitable catalyst. A commonly employed catalyst is benzyltrimethylammonium chloride. Other compounds such as 2-methylimadazole can also be used as a catalyst for the curing reaction.

Another class of useful resins are the unsaturated polyester resins. These are characterized by vinyl unsaturation in the polyester backbone. These unsaturated polyesters are obtained by polymerizing unsaturated polycarboxylic acids or anhydrides with polyhydric alcohols using known methods. Examples of the unsaturated polycarboxylic acids include fumaric acid, maleic anhydride, and maleic acid. Examples of polyhydric alcohols include ethylene glycol, propylene glycol, diethylene glycol, glycerol, trimethylol propane, trimethylol ethane, pentaerythritol and bisphenol A.

Another class of useful resins are alkyd resins. Alkyd resins are obtained by reacting a dihydric or polyhydric alcohol and a polybasic acid or anhydride in the presence of a drying oil using known techniques. Examples of the dihydric or polyhydric alcohols include glycerol, pentaerythritol, sorbitol and diethylene glycol. Examples of the polybasic acids or anhydrides include phthalic acid, isophthalic acid, maleic anhydride, fumaric anhydride, non-conjugated linoleic acid, oleic acid, adipic acid, azelaic acid, sebacic acid, tetrachlorophthalic anhydride, and chlorendic anhydride. Examples of the drying oils include soybean oil, linseed oil, dehydrated castor oil, non-oxidizing castor and coconut oils, tung oil, oitica oil, fish oil, sunflower oil, walnut oil, safflower seed oil and tall oil. These alkyd resins may be produced, for example, by direct fusion of glycerol, phthalic anhydride and drying oil at a temperature in the range of from about 210° C. to bout 235° C. The amount of drying oil varies depending on the intended use.

Melamine-formaldehyde and urea-formaldehyde resins are useful in the coatings industry. These resins are used primarily as cross linkers for hydroxyl-bearing resins. As cross-linkers, they are usually not the sole binder in surface coating; they are generally a minor resinous component usually comprising less than about 35 per-cent of the total non-volatile binder by weight. The term "binder" refers to the combined weight of the resin and the crosslinking agent.

Melamine-formaldehyde and urea-formaldehyde resins are the products of the reaction of formaldehyde with melamine or with urea. Either melamine or urea resins (or mixtures thereof) may be used as the cross-linking agents, although the melamines generally provide a greater degree of cross-linking. Useful melamine and urea resins are the alkoxy alkyl and the alkylol melamines and ureas. Specific examples include: alkoxymethyl melamines and ureas in which the alkoxy groups have 1–4 carbon atoms such as hexaalkoxy (methoxy, ethoxy, propoxy, butoxy and mixed alkoxy) methyl melamines and dialkoxy methyl ureas; and the alkylol melamines and ureas such as hexamethylol melamine and dimethylol urea. These cross-linking agents are particularly useful when the cross-linkable resin is an alkyd resin, a polyester resin, an epoxy resin or an acrylic resin.

Cellulose resins are another class of resins used as the film-forming resins within the scope of the present invention. Although the resins are synthetic, they are produced from the natural polysaccharide polymer cellulose, which is derived from cotton linters or wood pulp. Cellulose resins include cellulose esters including nitrocellulose, carboxylic esters of cellulose, such as cellulose acetate, and cellulose ethers, such as hydroxyethyl cellulose. Nitrocellulose is made by nitrating cellulose with a mixture of nitric and sulfuric acids in the presence of water. Nitrocellulose lacquers are formulated by suitable blending of nitrocellulose resins and solvents. Base nitrocellulose resin is generally blended with other resins and plasticizers to give satisfactory compositions. Nitrocellulose has good compatibility with other resin systems. Thus, acrylics, phenolics, vinyls, epoxies, natural resins, amino resins and alkyds are used to upgrade performance and durability of nitrocellulose.

Another class of resins that can be used in the present invention are the acrylic resins which are obtained by polymerizing a suitable combination of a functional group-containing monomer and another copolymerizable monomer in an ordinary manner. The polymerization reaction is usually initiated by free radical generators such as benzoyl peroxide or azobisisobutyronitrile (AIBN) and the reaction is a four-part process with the following steps occurring at different rates: (1) Initiation, (2) Propagation, (3) Chain transfer, and 4) Termination. The polymerization temperature is ordinarily between about 60° C. and about 100° C. and polymerization time is usually about 3 to about 10 hours. Examples of the functional group-containing monomers include hydroxyl group-containing monomers such as beta-hydroxyethyl acrylate, beta-hydroxypropyl acrylate, beta-hydoxyethyl methacrylate, beta-hydroxypropyl methacrylate, N-methylol acrylamide and N-methylol methacrylamide; carboxyl-group containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene, propylene and isobutylene, aromatic monomers such as styrene, vinyltoluene and alphamethylstyrene; esters of (meth)acrylic acid and alcohols of 1 to about 18 carbon atoms such as methyl (meth)acrylate, ethyl(meth)acrylate, propyl(meth)acrylate, n-butyl(meth)acrylate, isobutyl(meth)acrylate, cyclohexyl (meth)acrylate, 2-ethylhexyl(meth)acrylate and lauryl(meth) acrylate; vinyl esters of carboxylic acid of about 2 to about 11 carbon atoms such as vinyl acetate, vinyl propionate and vinyl 2-ethylhexanoate; as well as vinyl chloride, acrylonitrile and methacrylonitrile. They may be used either alone or in the form of a mixture of two or more.

Acrylic resins useful for thermosetting powder coatings generally have glass transition temperatures ($T_g$) above about 65° C. and melting ranges between about 70–110° C. to ensure the necessary physical stability and ease of application. In addition to this, they generally possess reactive groups so that they can be crosslinked after application to the substrate. Two types of acrylic resins have been developed to fulfill these requirements, namely hydroxy functional acrylic resins that can be crosslinked with blocked isocyanates and epoxy functional acrylic resins that can be crosslinked with a crystalline dibasic aliphatic acids such as decanedicarboxylic acid and dodecanedicarboxylic acid.

In one embodiment of this invention, the film forming resin composition (a) comprises an acrylic-epoxy hybrid resin. In one embodiment, the acrylic component of this hybrid resin is a saturated carboxylated acrylic resin. In one embodiment this acrylic resin has a carboxy equivalent weight of about 750, an acid number of about 75, a molecular weight of about 17000, and a glass transition temperature ($T_g$) of about 57° C. It is available from S. C. Johnson Polymer under the name "SCX 819". This carboxylated acrylic resin can crosslink with epoxy resins based on Bisphenol A or with other acrylic resins based on glycidyl methacrylate.

In one embodiment of the present invention, the film forming resin composition (a) comprises a saturated hydroxy-functional acrylic resin. In one embodiment, this hydroxy functional acrylic resin has a hydroxy equivalent weight of about 600, a molecular weight of about 18,000, a glass transition temperature ($T_g$) of about 50° C. and a hydroxyl number of about 94. It is available from S. C. Johnson Polymer under the name "JONCRYL™ 587". This acrylic resin can be cured with an isocyanate containing curative such as a blocked isophorone diisocyanate adduct.

In one embodiment, the film forming resin composition comprises an acrylic-polyester hybrid resin. The acrylic-polyester hybrid resin comprises an acrylic resin such as the aforementioned hydroxy functional acrylic resin and a carboxylated polyester resin. The acrylic-polyester hybrid system can also be cured with an isocyanate containing curing agent such as a blocked isophorone diisocyanate (IPDI) adduct.

As already mentioned above, catalysts or accelerators may be used to increase the rate of reaction between a resin and a hardener and are included within the film forming resin composition. They are usually added at levels between about 0.1 to about 1.0% and can be used to either reduce the curing time at a given temperature or alternatively, reduce the curing temperature. The catalyst employed depends on the film forming resin and the hardener. Typical catalysts include imidazoles, cyclic amidine, alkyl/aryl ammonium halides, and zinc alkyl/aryl thiocarbamates.

The concentration of the film forming resin composition in the coating composition will vary depending on whether the coating composition is a solvent-based, or a solvent-free, such as a powder coating composition and further whether the coating composition is a pigmented or clear (i.e. not having any pigments) system. For solvent-based systems, the concentration of the film forming resin composition will typically be about 10 to about 80%, more preferably about 20 to about 65% based on the total weight of the composition. For a powder coating composition, the concentration of the film forming resin composition will typically be about 45 to about 95%, more preferably about 60 to about 90% by weight based on the total weight of the powder coating composition.

The Additive Composition of the Coating Composition

The second major component of the coating composition of this invention is the non-flatting and slip-enhancing additive composition. The words "non-flatting and slip-enhancing amount" denote any amount of the additive composition that is sufficient to provide the coatings with non-flatting and slip-enhancing property. In one embodiment the additive composition (b) is present at a level of at least about 0.01% by weight of the coating composition. In one embodiment, it is present at a level of about 0.01 to about 5%; in one embodiment about 0.1 to about 3%; and in one embodiment about 0.2 to about 2% by weight of the coating composition.

The words "non-flatting" denote that the additive composition when incorporated in a coating composition is able to retain at least about 75% of the initial gloss. The words "initial gloss" denote the gloss of the cured (in the case of a composition containing a thermosetting resin) or heat-treated (in the case of a coating composition containing a thermoplastic resin) coating composition without the additive composition (b). Gloss is usually measured according to test method ASTM D-523. In one embodiment, at least about 85% of the initial gloss is retained. In one embodiment, at least about 95% of the initial gloss is retained. In one embodiment, the gloss is enhanced compared to the initial gloss.

The words "slip-enhancing" denote that a cured (in the case of a composition containing a thermosetting resin) or heat-treated (in the case of a coating composition containing a thermoplastic resin) coating composition containing the additive composition (b) has an improved (i.e. lower) coefficient of friction compared to a powder coating composition without the additive (b). Coefficient of friction measurements are usually made according to test method ASTM D-4518.

The additive composition of the present coating composition comprises the aforementioned combination of (a) at least one non-crosslinked product made by reacting an amine with a carboxylic acid or a reactive equivalent of the carboxylic acid and (b) at least one fluoropolymer.

The additive composition of this invention is usually present at a level of at least about 0.01% by weight of the coating composition. In one embodiment, it is present at a level of about 0.01 to about 5%, and in one embodiment about 0.1 to about 3%, and in one embodiment about 0.2 to about 2% by weight of the coating composition.

Other Optional Components of the Coating Composition

The coating composition of the present invention may contain a carrier. The carrier can include organic solvents for organic coating compositions or water for aqueous coating compositions. The coating compositions can therefore be solvent-free, water-borne, organic solvent-borne, or a powder coating composition.

The coating composition of this invention can also contain other additives, such as rheology control agents (thixotropes), flow and leveling additives, deaerating agents, pigments, fillers, and special effect additives.

Thixotropes for solvent-borne systems can be classified into various groups, such as castor oil derivatives, high molecular weight polyolefins, monotmorillonite and other clays, fumed silicas, fibrous materials, calcium sulfonate derivatives and other liquid additives that are generally used in combination with or more of the above classes. The properties and uses of these thixotropes are well known to those skilled in the art of paint chemistry and formulation.

Flow and leveling additives are usually employed to modify surface tension and surface tension gradients. These additives are typically surfactants. Flow control additives are another component of a coating composition. Flow control additives in powder coating formulations are highly desirable, as without them, it is often difficult to obtain cured films with good flow and appearance and without craters or other surface defects. The flow control additives for powder coatings can be solids or liquids; however they normally consist of highly viscous liquids based on polyacrylates. They are supplied either in the form of so-called master batches, i.e., they have been added to the resin by the resin manufacturer right after the resin cooking cycle and just prior to flaking, or the additive is absorbed on finely divided silica and can be added to the powder premix directly. Thus even though the flow control additive for powder coatings can by itself, be a liquid, the powder coating composition as a whole is in the form of a powder.

The coating composition of the present invention can also contain a deaerating agent, such as benzoin. Benzoin is said to act as an anti-pinholing agent and as a degassing aid, and it is generally believed that it improves the appearance of the cured coating.

Pigments can be defined as finely ground materials which are insoluble in the medium (binder) to be used and which provide color and hiding power to the coatings. Pigments can also influence many other important properties of the finished coating such as water permeability, flexibility and impact resistance.

Pigments can generally be divided into inorganic and organic pigments. Inorganic pigments include titanium dioxide, iron oxide, chromium oxide and carbon black. Organic pigments include blue pigments, such as copper phthalocyanine blue, indanthrone blue, carbozole violet; red pigments, such as cadmium red, quinacridone red, and thioindigo red; yellow pigments such as benzidine yellow, and benzimidazolone yellow; orange pigments, such as benzidine orange, green pigments, such as copper phthalocyanine green; and violet pigments such as quinacridone violet.

One or several pigments can be used in a coating formulation. The details of the use of pigments are well-known to those skilled in the art.

Fillers, also called extenders, are chemically inert materials that are insoluble in the binder to be used and which impart certain properties to the coating. Fillers can lower the cost of a final coating composition, and also affect such properties and gloss, flexibility, flow characteristics, storage stability, density and porosity. Some of the most commonly used fillers include lithopone, barium sulfate, silicates and calcium carbonates.

The powder coating composition of this invention can also include certain special effect additives. Special effects such as metallic finishes, hammertone finishes and textured or structured finishes are, generally, more difficult to achieve with powder coatings than with conventional liquid coatings. Textured finishes can be obtained by the incorporation of certain inert additives such as polypropylene, nylon, and some special waxes. Hammertone finishes are achieved by the incorporation of a contaminant that competes against the flow of the resin system used. In fact, the cured coating can have many craters and in the presence of an aluminum pigment the hammertone effect will appear. Metallic finishes are difficult to achieve in powder coatings due to the lack of orientation effects of pigments or filler particles (due to very high viscosities during film formation). They can also be quite hazardous due to the combustible nature of the metallic pigments. Methods to incorporate metallic pigments to give a metallic finish to coatings include incorporation prior to the extrusion process, post-blending to the finished powder coating, and a special bonding process during which the metallic pigments are bonded to the surface of the powder particles after they have been ground. Application methods for powder coatings are known to those skilled in the art. They include the fluidized bed method, electrostatic fluidized bed method, electrostatic spray method, triboelectric spray method, use of internal and external corona guns, powder bells and powder rotary atomizers, the preferred method being the use of corona guns.

Furthermore, the general manufacturing process for powder coatings is also familiar to those skilled in the art, and include the stages of premixing, melt-mixing (extruding), and pulverizing.

In one embodiment of the present powder coating composition, the components of the powder coating composition are melt-mixed in an extruder into a homogeneous melt, and the melt is subsequently cooled and ground into a powder. The purpose of the melt mixing process or extrusion process in general is to distribute the various additives like pigments, fillers, catalysts, hardeners, flow agents, etc., of a powder coating composition as homogeneously as possible in the resin system. This melt mixing process can be done by an extruder. The resin and other components of the powder coating composition (such as additives, pigments, and flow agents) are melted and mixed into a homogeneous melt in the extruder. The resulting melt can subsequently be cooled and ground into a fine powder. The resulting powder can then be spray applied to a substrate using electrostatic powder spraying apparatus.

The homogeneous melt mixing process is to be distinguished from the "dry blending" process, which latter involves mixing together all the components of the powder coating composition under "dry" conditions. (It is to be noted however, that some components can be melt-mixed prior to a dry blending process. In this case the dry blending will mix the prior melt-mixed components with other components. For example, some liquid additives like flow agents are melt-mixed onto one of the solid components prior to a dry blending operation.). The energy generated during the dry blending operation may be sufficient to warm the resin to its glass transitin temperature ($T_g$). The granules of the resin may swell and the other ingredients (such as other additives and pigments) may stick to the outside of the resin granules. The resulting mixture can then be cooled to room temperature.

Dry blended powders, being generally made of larger granules that have other components embedded in the surface of the granules generally behave differently than an extruded, melt mixed homogeneous powder coating composition. A present powder coating composition where the additive composition is dry blended with the rest of the components of the powder coating composition will tend to have the additive on the surface of the granules. A melt mixed homogeneous powder coating composition, however has the additive homogenized into a polymer melt. Thus, there can be compositional differences between a melt mixed homogeneous powder coating composition and a dry blended powder coating composition. As a result, a powder coating composition which has the additive composition of the present invention dry blended with the rest of the components (such as resin composition, pigments, fillers, and flow agents) is expected to cause more surface defects than a powder coating composition where the additive composition is melt mixed with the other components in an extruder to give a homogeneous powder coating composition.

Furthermore, powder coating compositions wherein the components of the powder coating composition are mixed by dry blending are generally not suited for electrostatic applications as the powder granules are too large. In general, high gloss thin film coatings are not usually achieved in a powder coating application where the components of the coating composition are mixed by dry blending. Such dry blended compositions are generally suited for fluidized bed applications wherein preheated substrates are dipped into a fluidized bed containing the powder coating composition for application of the coating composition onto the substrate. Substrates coated by this (fluidized bed) method generally do not have thin film or high gloss coatings, as controlled film builds are generally very difficult to achieve by this method of coating. On the other hand, melt-mixed extruded homogeneous powder coating compositions can be easily spray applied to a substrate using electrostatic powder guns, and the coated substrate can have controlled thickness as the powder is finer and it is easier to control the application of the powder coating composition onto the substrate.

Substrates for powder coatings include metal, wood and plastic, and glass. Examples of substrates that have been powder coated industrially include office furniture, appliances (such as refrigerators, freezers, washing machines) as well as automotive body panels.

The temperature used to heat the applied powder coating composition on suitable substrates to form the film varies depending on whether the coating composition is a thermoplastic or thermosetting system, with higher temperature being applied for curing the thermosets. The temperature for melting the coating composition ranges from 70 to 90° C. (for thermoplastics and thermosets); for curing of thermosets, the temperature is further raised to 150–200° C. The film thickness of the coating ranges from 10–500 microns (0.5–20 mils), more preferably 10–250 microns (0.5–10 mils). The cured coatings with the additive are non-flatting and have enhanced slip properties compared to coatings without the additive.

An excellent source describing the chemistry, uses and applications of various resins and additives used in coatings is *Protective Coatings-Fundamentals of Chemistry and Compositions* by Clive H. Hare, Technology Publishing Company, Pittsburgh, Pa. (1994).

A particularly excellent source describing the chemistry, manufacture, and application of powder coatings is Powder Coatings by Josef H. Jilek, published by Federation of Societies for Coatings Technology, Darlene Brezinski & Thomas J. Miranda, Eds.(1993).

EXAMPLES

Example 1 below illustrates the synthesis of an amide product (component (b) (i)) of this invention.

Example 1

A 500 mL flask equipped with stirrer, thermal well, subsurface $N_2$ inlet and a Dean-Stark trap is charged with 173.2 g (0.638 mole) of stearic acid. Diethanolamine (23.1 g; 0.22 mole) is then added over 30 minutes at 90° C. $N_2$ is purged through at 2.8 L/hr and the reaction mixture is further heated to 150° C. in 0.8 hr, and then to 170° C. in 0.5 hr. The reaction mixture is held at 170° C. for 2 hours and then heated to 205° C. in 0.25 hr. A total of 10 mL of water is collected in the trap. The reaction mixture is held at 205–209° C. for 2.75 hr. Acid Neutralization number (NNA) is 13.7. The reaction mixture is further heated at 210° C. for 4 hr. The reaction mixture is filtered at 110° C. using 13 g of filter aid. The filtrate is collected as the product. On cooling, the material solidifies at about 53° C.

Example 2

Evaluation of a coating composition containing a blend of reaction product of example 1 and polytetrafluoroethylene (PTFE) in a polyester resin/isocyanate curative powder coating formulations)

Tables 1 shows a polyester resin/isocyanate curative powder coating formulation used in the evaluation of sorbitan tristearate as a non-flatting slip-enhancing.

TABLE 1

Polyester Resin/Isocyanate curative based Powder coating formulation used in evaluation of the additive composition

| Raw Material Trade Name | A (Control) | B | C |
|---|---|---|---|
| RUCO ™ 102[1] | 56.86 | 56.01 | 56.01 |
| RUCO ™ NI-2[2] | 9.74 | 9.59 | 9.59 |
| Uraflow ™ B[3] | 0.40 | 0.40 | 0.40 |
| Resiflow ™ P67[4] | 1.0 | 1.0 | 1.0 |
| Blanc Fixe Micro[5] | 30.0 | 30.0 | 30.0 |
| Product of Example 1 | — | 1.0 | — |
| Blend of Prod of Example 1 (90%) + PTFE (10%) | — | — | 1.0 |
| Special Black #4[6] | 2 | 2 | 2 |

[1]Polyester resin (Ruco Polymers);
[2]Isocyanate-containing curative (Ruco Polymer);
[3]Benzoin (release agent; GCA Chemical);
[4]Flow agent(Estron Chemical);
[5]Inert filler (precipitated $BaSO_4$; Sachtleben (ORE Chemicals)) ;
[6]Carbon black pigment (Degussa)

The performance results are shown in Table 2.

TABLE 2

Test Results of Powder Coating Compositions of Table 1

| Test Measurements | A (Control) | B | C |
|---|---|---|---|
| gloss (60°) (ASTM D523) | 87 | 87 | 86–87 |
| gloss (20°) (ASTM D523) | 48–50 | 55–57 | 54–55 |
| DOI (Distinction of Image) (ASTM E430-91 & E284) | 30 | 40 | 37 |
| Color CIELAB Spectral included (ASTM D2244-93) | | | |
| DL | — | −0.19 | −0.11 |
| Da | — | −0.03 | 0 |
| Db | — | 0.08 | 0.28 |
| DE | — | 0.16 | 0.20 |
| Appearance (Visual) | OK | OK | OK |
| Film build (mils) | 1.4–2.0 | 0.95–2.0 | 0.95–2.3 |

TABLE 2-continued

Test Results of Powder Coating Compositions of Table 1

| Test Measurements | A (Control) | B | C |
|---|---|---|---|
| Coefficient. of Friction (D4518) | | | |
| Max static | 0.1306 | 0.1102 | 0.0433 |
| (Dynamic) Ave. | 0.1144 | 0.1043 | 0.0546 |
| Standard deviation. | 0.0110 | 0.0075 | 0.0064 |

Processing:
Premix- 30 secs. wearing blender
Extruding: Baker-Perkins APV MP19PC 15:1 twin screw extruder
Barrel 90° C. Zone 1; 110° C. Zone 2; RPM = 350; Feeder 25; Rolls 21.9
Components were ground using bench top grinder, sieved through a 140 mesh screen, and sprayed using Nordson Versaspray II powder spray gun.
Substrate: Phosphate coated cold rolled steel panel-Bonderite 1000 Parkalene 60 deionized water rinsed, unpolished
Cure: 15 minutes @ 191° C. (375° F.) in precision electric oven Compared to the control formulation without any slip additive (formulation A), the results with the combination of PTFE and the product of example 1 (formulation C) in the above Polyester resin/Isocyanate curative formulation show improved 20° gloss, equivalent 60° gloss, and improved slip properties (lower coefficient of friction). Compared to the formulation with the product of example 1 alone (formulation B), the composition with the combination of PTFE and product of example 1 (formulation C) shows equivalent 60° gloss, and equivalent to slightly reduced 20° gloss, but improved slip properties. However, an additional advantage of the blend over the amide product of example 1 can be seen in results of a cardboard mar double rub test. This test measures the anti-mar/anti-scratch property of a coating composition.

The procedure for this test is as follows: A new, unused cardboard box is cut out into several strips that are 1.5 inches wide and 6–8 inches long. A strip of the cardboard back is folded upon itself until the two halves meet together which leaves a sharp edge at the bend. The folded cardboard is placed against the metal panel to be tested with the sharp bend toward the coating's surface. Using hand pressure only, the cardboard is rubbed across the surface of the coating in the direction of the wide part of the cardboard. One (1) stroke double rub consists of a back and forth motion across the panel. The number of double rubs that it takes to produce scratches that are easily seen with the unaided eye are reported.

The results of this test is shown in table 3.

TABLE 3

Cardboard Mar Double Rub Test Results

| | A (Control) | B | C |
|---|---|---|---|
| # Strokes to scratch | 40 | 40 | 60 |

The data of table 3 indicate that composition C containing the blend of PTFE and the reaction product of example 1 performs better as a anti-mar/anti-scratch composition than either the composition containing the reaction product of example 1 alone, or the composition without any additive.

Example 3

Evaluation of combination of PTFE and the product of example 1 in a epoxy-polyester hybrid resin based powder coating formulation.

Table 4 shows an epoxy-polyester hybrid resin based powder coating formulation used in evaluating a composition of the present invention.

TABLE 4

Epoxy-Polyester Hybrid based Powder Coating Formulation used in the evaluation of an additive composition

| Raw Material Trade Name | A (Control) | B | C |
|---|---|---|---|
| Uralac ™ P 5127[1] | 33.6 | 33.6 | 33.6 |
| D.E.R. 663U[2] | 33.6 | 33.6 | 33.6 |
| Blanc Fixe F[3] | 30.4 | 30.4 | 30.4 |
| Special Black #4[4] | 1.0 | 1.0 | 1.0 |
| Lanco-Flow ™ P10[5] | 1.0 | 1.0 | 1.0 |
| Benzoin[6] | 0.4 | 0.4 | 1.0 |
| Product of Example 1 | — | 1.0 | — |
| Blend of Prod of Example 1 (89%) + PTFE (11%) | — | — | 1.0 |

[1]Saturated carboxylated Polyester resin (DSM Resins BV);
[2]Bisphenol A based epoxy resin (Dow Chemical);
[3]Inert filler (precipitated $BaSO_4$; Sachtleben (ORE Chemicals));
[4]Carbon black pigment (Degussa);
[5]Flow control agent (Lubrizol);
[6]Release agent (GCA Chemical);

Performance results are shown in Tables 5.

TABLE 5

Test Results of Powder Coating Compositions of Table 4

| Test Measurements | A (Control) | B | C |
|---|---|---|---|
| gloss (60°) (ASTM D523) | 100 | 99 | 95 |
| gloss (20°) (ASTM D523) | 89 | 91 | 83 |
| Coefficient of Friction (Dynamic) (ASTM D4518) | 0.215 | 0.100 | 0.095 |

Processing:
Premixing- Powder coating components were weighed up and mixed in a bag.
Extruding- All materials were extruded twice with a "APV 19PC" twin screw extruder with a barrel length of 15 L/D at following parameters:
Barrel zone 1: 60° C.
Barrel zone 2: 100° C.
melting temperature: 70–75° C.
screw r.p.m.: 300
torque: 60–70%
Grinding- After crushing, the samples were ground with a Retsch Z-100 mill. Then the coatings were sieved with a 100 μm sieve.
Application- The coatings were sprayed with a powder-manual-pulverizing tool on aluminum panels by the Corona- method:
Voltage: 80 KV
Delivery air: 1.2 bar
Curing-The panels were cured at 160° C. for 18 minutes.

In the Epoxy-Polyester blend formulation, the results with the blend of PTFE and the product of example 1 (formulation C, table 5) show somewhat lower gloss compared to the control (formulation A) and the formulation with the product of example 1 alone (formulation B), but somewhat improved slip properties. Even with the lower gloss values however, most (93–95%) of the initial gloss is retained.

Each of the documents referred to above is incorporated herein by reference. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the amount, range, and ratio limits set forth herein may be combined.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A concentrate comprising about 10% to about 90% by weight of a carrier and an additive composition comprising:
   (a) at least one non-crosslinked product made by the reaction of an amine and a carboxylic acid or a reactive equivalent of said carboxylic acid; said product comprising at least two hydrocarbyl groups, each hydrocarbyl group having about 12 to about 100 carbon atoms; and
   (b) at least one fluoropolymer.

2. A coating comprising:
   a film-forming resin composition; and a non-flatting and slip-enhancing amount of an additive composition comprising:
   (a) at least one non-crosslinked product made by the reaction of an amine and a carboxylic acid or a reactive equivalent of said carboxylic acid; said product comprising at least two hydrocarbyl groups, each hydrocarbyl group having about 12 to about 100 carbon atoms; and
   (b) at least one fluoropolymer.

3. The composition of claim 2 wherein the film forming resin composition comprises a thermoplastic resin.

4. The composition of claim 2 wherein the film forming resin composition comprises a thermosetting resin.

5. The composition of claim 2 wherein the film-forming resin composition comprises a resin selected from the group consisting of epoxy resins, polyester resins, unsaturated polyester resins, melamine-formaldehyde resins, urea-formaldehyde resins, acrylic resins, nitrocellulose, and mixtures of two or more thereof.

6. The composition of claim 2, further comprising a carrier.

7. The composition of claim 6 wherein the carrier is water or an organic solvent.

8. The composition of claim 2 wherein the coating composition is water-borne, organic solvent-borne, solvent free, or a powder coating composition.

9. The composition of claim 2 wherein the coating composition is a powder coating composition.

10. The composition of claim 9 wherein the components of said powder coating composition are melt-mixed in an extruder into a homogeneous melt, and the melt is subsequently cooled and ground into a powder.

11. The composition of claims wherein the film forming resin composition (a) comprises a oil-free polyester resin and an isocyanate-containing curative.

12. The composition of claims 11 wherein the isocyanate-containing curative is an ε-caprolactam blocked isophorone diisocyanate.

13. The composition of claim 9 wherein the film forming resin composition comprises an epoxy-polyester hybrid resin.

14. The composition of claim 13 wherein the epoxy-polyester hybrid resin comprises a type 3–3.5 bisphenol A epoxy resin.

15. The composition of claim 13 wherein the epoxy-polyester hybrid resin comprises a saturated, carboxylated polyester resin.

16. The composition of claim 9 wherein the film forming resin composition comprises an acrylic-epoxy hybrid resin.

17. The composition of claim 16 wherein the acrylic-epoxy hybrid resin comprises a saturated, carboxylated acrylic resin.

18. The composition of claim 9 wherein the film forming resin composition comprises an acrylic-polyester hybrid resin and an isocyanate containing curative.

19. The composition of claim 18 wherein the acrylic-polyester hybrid resin comprises a saturated, hydroxy functional acrylic resin.

20. The composition of claim 2 wherein the additive composition is present at a level of at least about 0.01% by weight of the coating composition.

21. A powder coating composition comprising:
   (a) a film-forming resin composition selected from the group consisting of oil-free hydroxy-functional polyester resins containing isocyanate curatives and epoxy-polyester hybrid resins; and
   (b) a non-flatting and slip-enhancing amount of an additive composite comprising the combination of:
      (i) at least one product made by reacting stearic acid and diethanolamine wherein the mole ratio of stearic acid to diethanolamine is about 2:1 to about 3:1 and
      (ii) a polytetrafluoroethylene;
   wherein the weight ratio of (b)(i) to (b)(ii) ranges from about 70:30 to about 99:1.

22. A method for coating a substrate comprising the steps of:
   (I) applying a coating composition on said substrate, said coating composition comprising:
      a film-forming resin composition; and
      a non-flatting and slip-enhancing amount of an additive composition, comprising:
         (a) at least one non-crosslinked product made by the reaction of an amine and a carboxylic acid or a reactive equivalent of said carboxylic acid; said product comprising at least two hydrocarbyl groups each hydrocarbyl group having about 12 to about 100 carbon atoms; and
         (b) at least one fluoropolymer; and
   (II) heating the applied coating composition from step (I) to form a film.

23. The method of claim 22, wherein in step (I), the coating composition is a powder coating composition.

24. The method of claim 23 wherein the film-forming resin composition and the additive composition are melt-mixed in an extruder into a homogeneous melt which is subsequently cooled and ground into a powder.

* * * * *